United States Patent
Lenker

(10) Patent No.: US 7,100,324 B2
(45) Date of Patent: Sep. 5, 2006

(54) INSERT TRAP COMPRISING A TAPERED BAG ATTACHMENT

(75) Inventor: Don H. Lenker, Salinas, CA (US)

(73) Assignee: Trece, Inc., Adair, OK (US)

( * ) Notice: Subject to any disclaimer, the term of this patent is extended or adjusted under 35 U.S.C. 154(b) by 7 days.

(21) Appl. No.: 10/877,471

(22) Filed: Jun. 26, 2004

(65) Prior Publication Data
US 2004/0231229 A1 Nov. 25, 2004

Related U.S. Application Data

(62) Division of application No. 10/142,117, filed on May 8, 2002, now abandoned.

(60) Provisional application No. 60/291,146, filed on May 15, 2001.

(51) Int. Cl.
*A01M 1/10* (2006.01)
(52) U.S. Cl. .......................... 43/107; 43/122
(58) Field of Classification Search ................. 43/107, 43/122, 118; D22/122
See application file for complete search history.

(56) References Cited

U.S. PATENT DOCUMENTS

| | | | | |
|---|---|---|---|---|
| 4,501,088 A | * | 2/1985 | Boisvert et al. | 43/118 |
| 4,706,410 A | * | 11/1987 | Briese | 43/107 |
| 4,873,787 A | * | 10/1989 | Schneidmiller | 43/122 |
| 4,899,485 A | * | 2/1990 | Schneidmiller | 43/122 |
| 5,172,513 A | * | 12/1992 | Reibling | 43/121 |
| 5,226,254 A | * | 7/1993 | MacMenigall | 43/107 |
| 5,392,558 A | * | 2/1995 | Blomquist | 43/107 |
| 6,158,165 A | * | 12/2000 | Wilson | 43/66 |

\* cited by examiner

*Primary Examiner*—Kurt Rowan
(74) *Attorney, Agent, or Firm*—Hana Verny; Peters, Verny, Jones, Schmitt & Aston, LLP

(57) ABSTRACT

A flexible bag and attachment mechanism is provided that may be used in a variety of applications where it is desirable to attach a flexible bag to a device or machine. Some examples of such device may include an insect trap, a grinder, volumetric or weight based filler and liquid dispenser, food or perishable storage, etc. According to one embodiment, the bag portion of the device is disposable and the attachment device is reusable. In one variation a tapered neck is attached to the opening of the bag. The tapered neck connects within a tapered collar of the device by way of a press fitting. The neck is flexible so that it can be deformed to a shape that permits it to enter into the collar, and is resilient so that it can return to its original tapered ring configuration to engage the tapered inner circumference of the collar. The bag may be attached to a dispenser for dispensing material. The dispenser may be in part, a grinder or mixer. The dispenser may be a water or liquid dispenser for filling water bags for transport in a backpack. The bag may be used to contain attractants for an insect trap and/or may be used to contain captured insects.

10 Claims, 6 Drawing Sheets

INSERT TRAP COMPRISING A TAPERED BAG ATTACHMENT

RELATIONSHIP TO COPENDING APPLICATIONS

This application is a Divisional application of Ser. No. 10/142,117, filed May 8, 2002 now abandoned, which claims priority from the Provisional application Ser. No. 60/291,146, filed May 15, 2001.

FIELD OF THE INVENTION

This invention concerns a flexible bag and attachment device that may be used in a variety of applications where it is desirable to attach a flexible bag to a device or machine, one particular application being in an insect trap.

BACKGROUND OF THE INVENTION

A number of outdoor insect traps have been used for capturing flies, yellow jackets etc, around homes, parks and other places, particularly where people are expected to be. Permanent or reusable traps that are typically made of a hard plastic have been used for these purposes. In these traps an attractant is placed in a trap designed to capture insects that enter into the trap. In order to reuse these traps as intended, they must be emptied. In certain circumstances, when emptying, live insects may escape and in the case of yellow jackets, may present a hazard. Use of these traps as disposable traps would be relatively expensive and require the entire trap to be discarded after a single use. A disposable trap has been proposed where a bag is permanently affixed to the trap. This trap however, requires disposal of the entire trap once it is used. Accordingly, it would be desirable to provide an economical trap comprising a disposable and/or replaceable tapered bag attachment.

SUMMARY OF THE INVENTION

The present invention provides a flexible bag and attachment mechanism that may be used in a variety of applications where it is desirable to attach a flexible bag to a device or machine. Some examples of such device may include an insect trap, a grinder, volumetric or weight based filler and liquid dispenser, food or perishable storage, etc. According to one embodiment, the bag portion of the device is disposable and the attachment device is reusable.

In one embodiment, the bag comprises a flexible material suitable for bags such as, e.g., paper or polypropylene. The material for the bag may be selected depending on its intended use. The bag has a narrow opening about which a neck member is attached to form a rim to maintain the opening in the bag. The neck member is constructed of a material having sufficient stiffness to retain it shape and sufficient flexibility to permit the neck to be deformed for insertion into a connector for connecting the bag to a device or cover. The neck member is tapered from its outside edge towards the bag. The neck is configured to connect to a device or cover having ring or collar with a tapered inner circumference or wall. To connect the bag with a device, the neck is resiliently deformed so that it may be placed through the tapered collar of the device or cover. The neck is then released allowing it to return to its normal shape. The device and the bag (and thus the neck member) are then pulled in a direction apart from each other so that the tapered neck engages the inner wall of the collar in a press fit coupling.

In one embodiment, the bag and attachment device are used as an insect trap. In this embodiment, an attractant or lure may be placed in the bag, attachment device or trap device, and a trap device is connected to the bag. The device to which the bag is attached provides entrance through which the insects may enter into the trap. An opening provided between the bag and the device provides fluid communication between the bag and device. This is useful where an attractant is placed in the bag; the attractant is in communication with the device so that the insects lured into the entrance in the device are collected in the bag.

The bag may be removed, refilled and reused by pushing the neck into the device and unlocking the taper, and then by folding or deforming the neck so that it fits back through the ring of the device. The bag may also be tied off, discarded and replaced by another bag.

In one variation, the bag may be attached to a dispenser for dispensing material. The dispenser may be in part, a grinder or mixer. The dispenser may be a water or liquid dispenser for filling water bags for transport in a backpack.

DETAILED DESCRIPTION OF THE DRAWINGS

DETAILED DESCRIPTION

Figure 1:
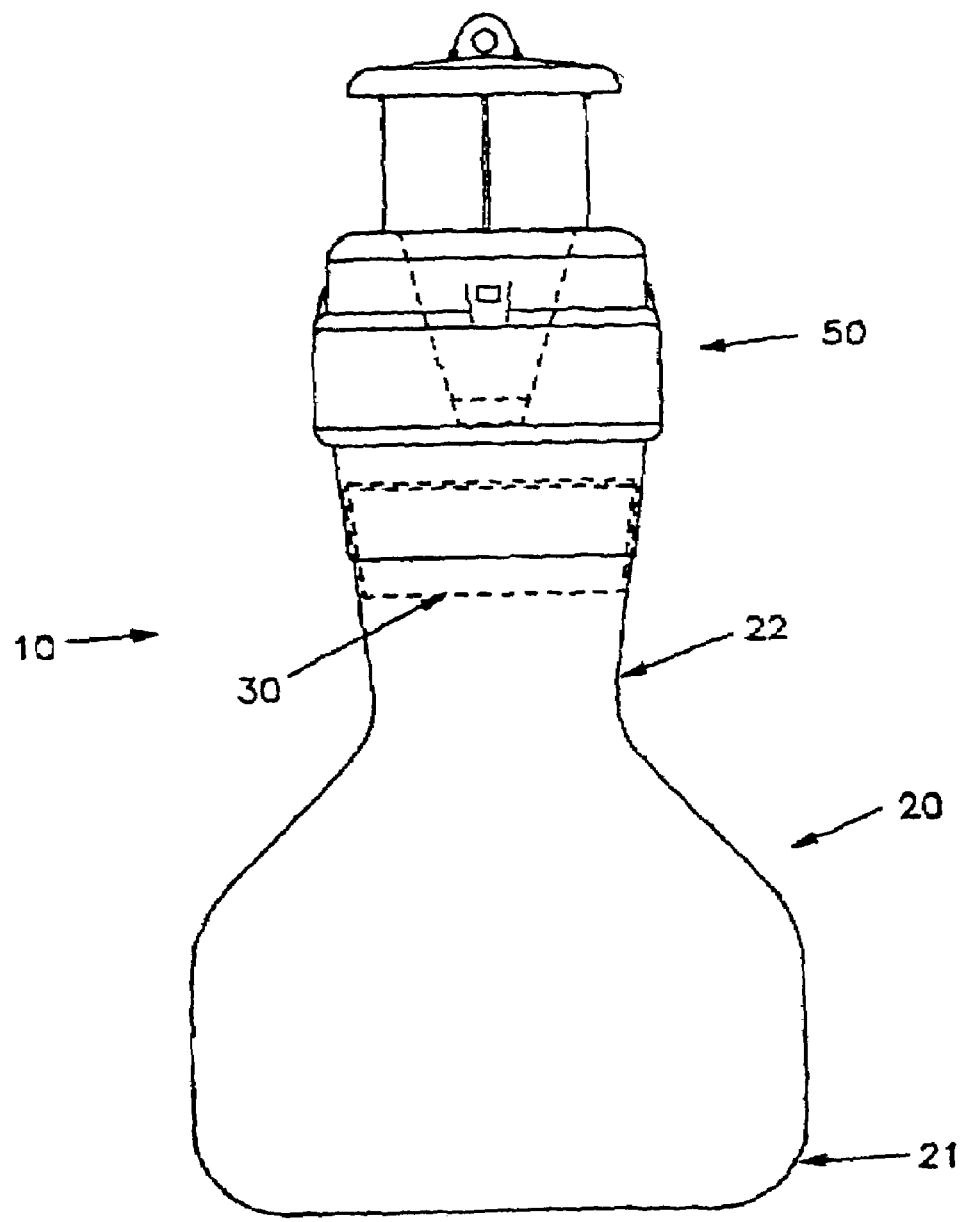
FIG. 1 is a side view of an assembled bag and attachment device according to an embodiment of the invention in which the bag and attachment device form an insect trap.
Figure 2:
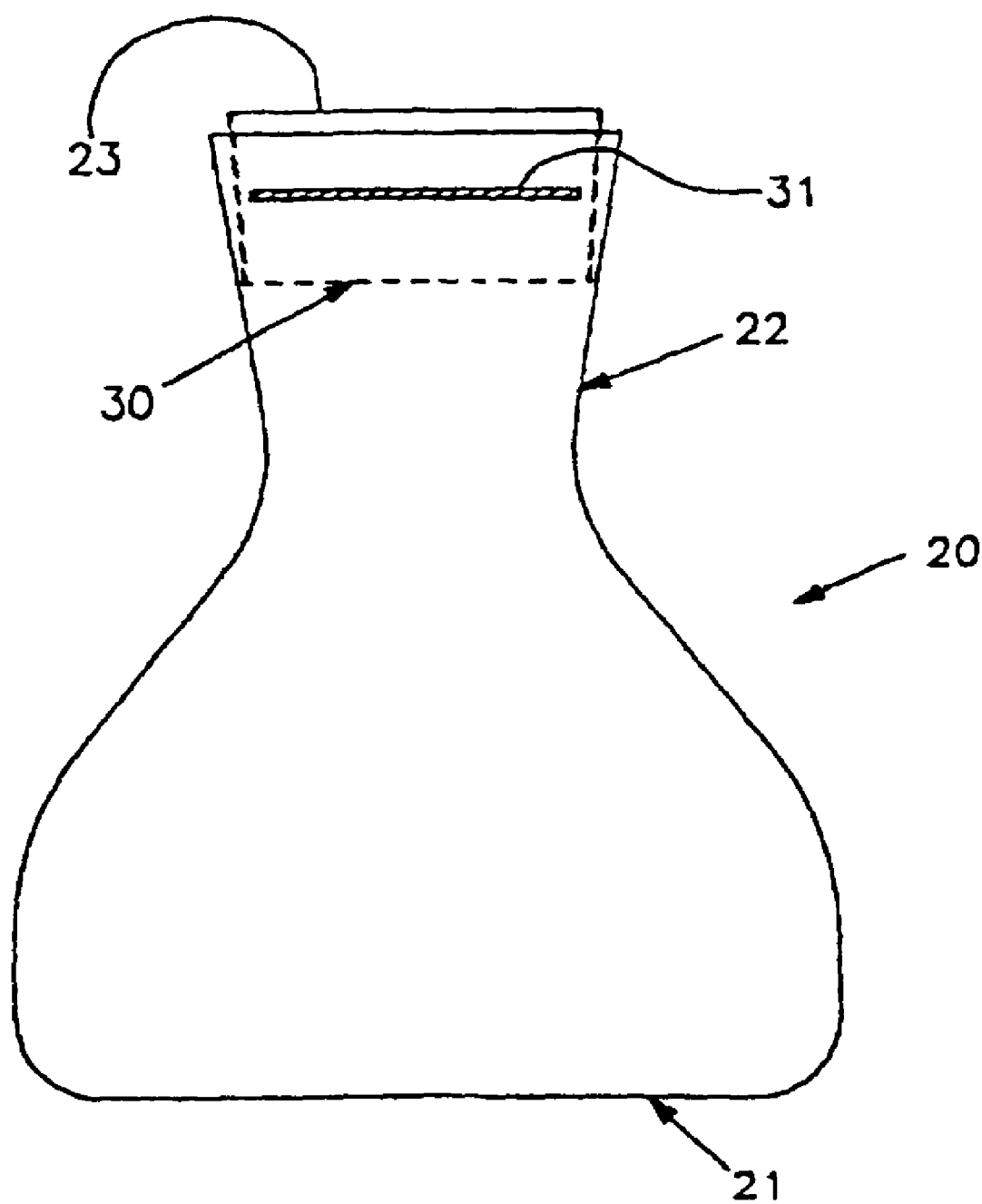
FIG. 2 is a side view of the bag with an attached neck according to the embodiment of FIG. 1.
Figure 3:
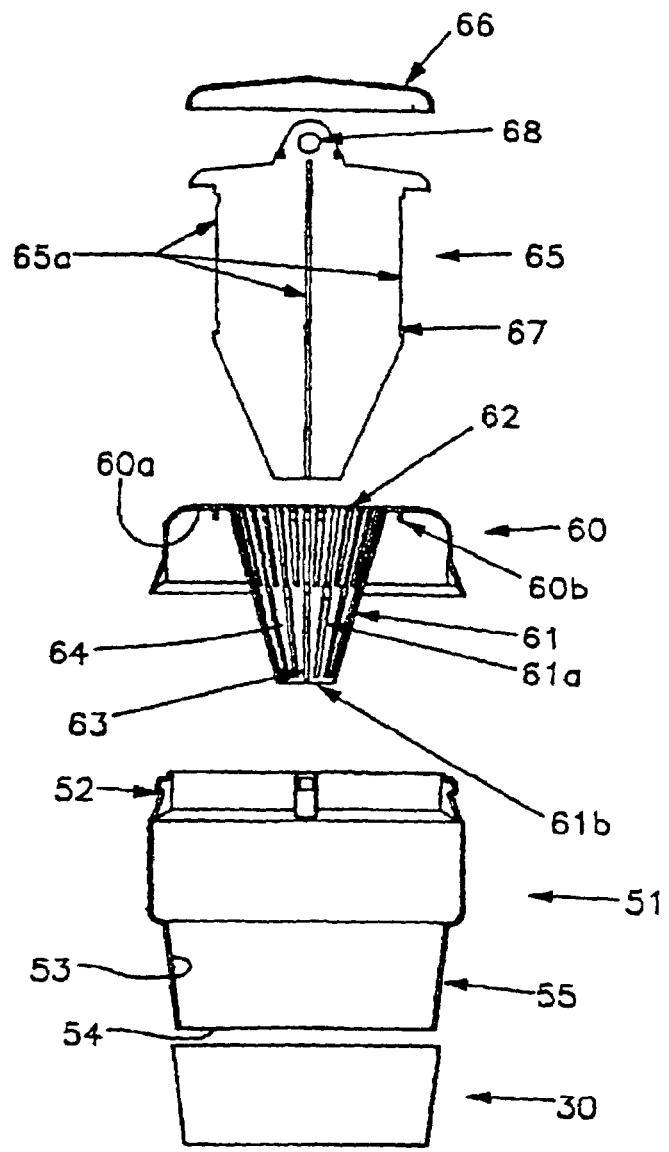
FIG. 3 is an exploded section view of the attachment device according to the embodiment of FIG. 1 in which the attachment device includes a neck for attaching to a bag and a trap device to releasably couple to bag by the neck.
Figure 4:
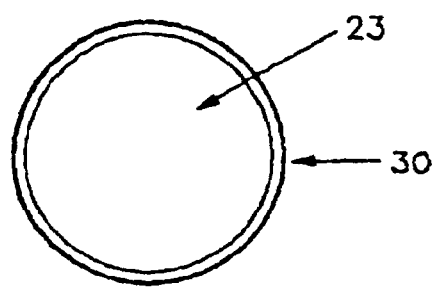
FIG. 4 is a top view of the neck according to the embodiment of FIG. 1
Figure 5:
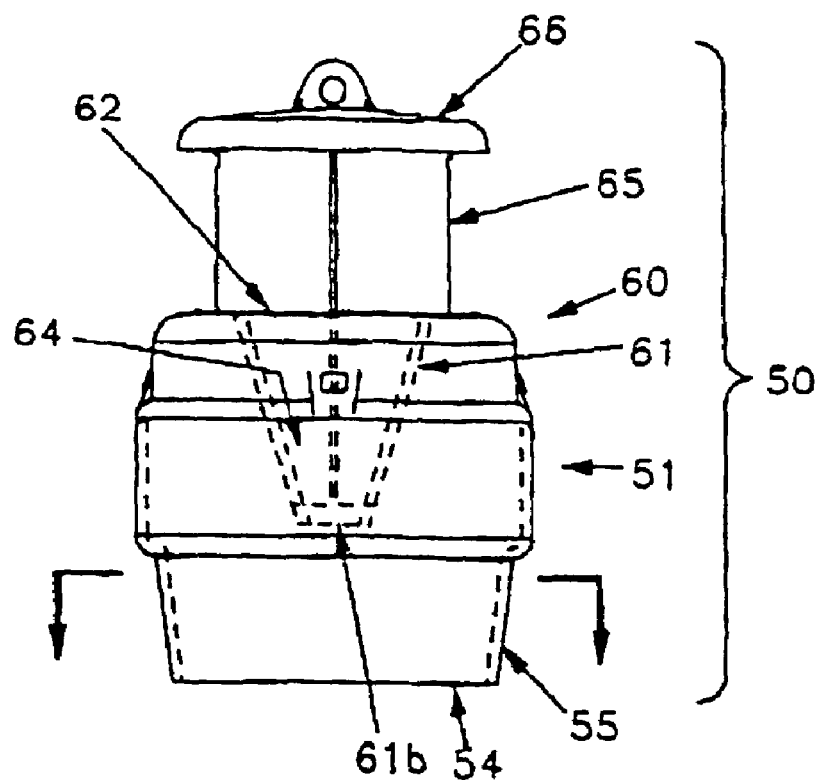
FIG. 5 is a side view of the trap device to the embodiment of FIG. 1 with the cap in an open position.
Figure 6:
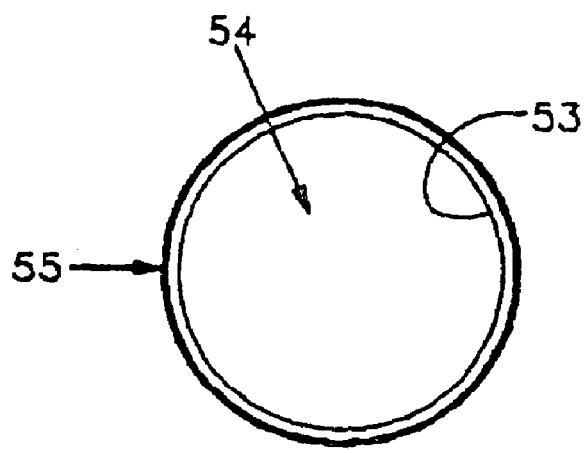
FIG. 6 is a section of the collar of the trap device of FIG. 5.
Figure 7:
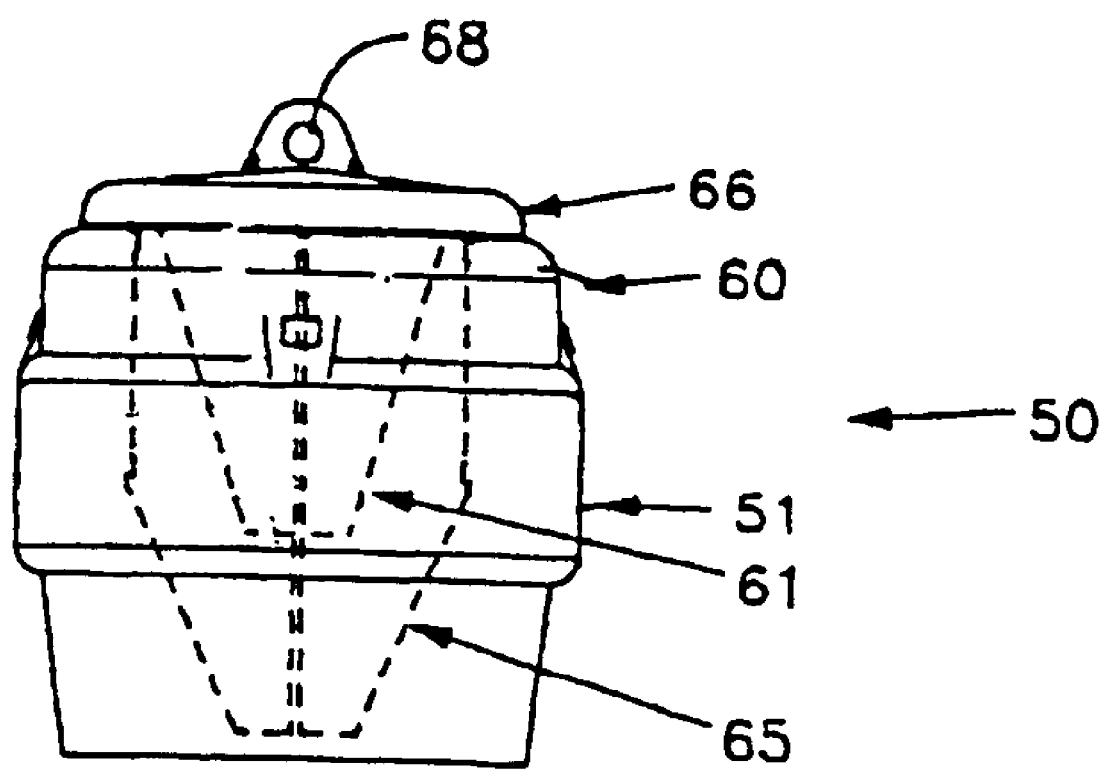
FIG. 7 is a side view of the trap device according to the embodiment of FIG. 1 with the cap and vanes in a closed position.

Referring to FIGS. 1–7 a bag 20 and trap device 50 (including an attachment device) of a first embodiment according to the invention is illustrated in which the bag 20 and trap device 50 form an insect trap 10. The bag 20 has a wider, closed bottom portion 21 for holding a solid or fluid substance, and/or for holding insects captured in the trap. The bag 20 further has a narrow neck region 22 with a neck opening 23. In one embodiment, the bag is manufactured of a thin polyethylene material that is capable of containing a liquid or solid material. However, the bag 20 may be constructed of any flexible material suitable for the intended use of the bag, including, e.g., paper, polymer material, etc. A neck member 30 is coupled around the opening 23 of the bag 20 to provide structural support for the opening 23 and to connect with the device 50. The neck 30 is conically tapered for engaging an attachment device in a press fit engagement. The neck member 30 is formed of a material that is sufficiently rigid to maintain the shape of the opening 23 and sufficiently flexible and resilient to permit deformation and resiliently return to its original shape. The neck member in one embodiment is about 0.015" thick and made of either high-density polyethylene or polypropylene. The neck member 30 illustrated in FIG. 2, is attached to the bag 20 around the inner circumference of the bag opening 23 by thermal bonding in the area 31 of the neck member 30. The top of the bag can also be simply folded over the neck member to couple the bag and neck member without a permanent physical attachment of the bag to the neck member. It is also possible the bag may be formed with a neck member of a suitable thickness as an integral part of the bag.

FIGS. 1–7 illustrate an embodiment of an attachment device that attaches to a bag according to the invention. A trap device 50 and an attached bag 20 form an insect trap 10 as illustrated in FIG. 1. The device 50 comprises a main body 51, a funnel body 60, a vane member 65 and a cap 66 that are assembled together by snap fit members or the like. The main body 51 has an upper end 52 coupled to the funnel body 60, and an attachment collar 55 having a lower opening 54 formed by a conically tapered side wall 53 for connecting to the neck 30 of the bag 20. The funnel body 60 comprises a vented funnel 61 providing a top opening 62 in the funnel body 60 that opens into conduit 64 through which insects may enter into the device 50. When assembled with the main body 51, the funnel 61 extends down past the location of the funnel body 60/main body 51 junction and exits at a funnel opening 61b into the main body 51 of the trap device 50. The vents 61a in the funnel 61 allow the odor or attractant to permeate through the funnel 61 and out the opening 62 to lure the insects through the funnel 61 and into the main body 51. The trap device 50 further comprises a vane member 65 having sliding vanes 65a. The vane member 65 is slidably coupled to funnel body 60. The cap 66 is snapped on to the top of the vane member 65, the cap 66 and vane member having an open position (FIG. 5) and an closed position (FIG. 7) wherein in the open position, the cap 66 uncovers the opening 62 in the funnel body 60, and, wherein in the closed position the cap 66 covers the top opening 62 and the trap device 50 is in a compact configuration for storage. The sliding vanes 65a extend through slits 63 in the vented funnel 61 that slidably guide the sliding vanes 65 through the slits 63 so that the cap 66 and vane member 65 may be moved between the open and closed positions. The sliding vanes 65a have notches 67 that engage protrusions 60b in the underside 60a of the funnel body 60 to lock the cap 66 and vanes 65 in an open position when the cap 66 is pulled up and the vanes 65 are pulled up through the slits 63. The notches 67 may be disengaged from the protrusions 60b by gently pressing down on the cap 66 so that the cap 66 and vanes 65 may be closed. When the cap 66 and vanes 65 are in an open position, the top opening 62 provides an entrance for insects into the vented funnel 61, which opens into the inside of the main body 51.

The neck 30 attached to the bag 20 is tapered engage to the tapered inner circumference of the attachment collar 55 of the main body 51. To attach the bag 20 to the device 50, the neck 30 with the bag 20 attached, is collapsed with the thumb and inserted into the bottom of the collar 55. The resilient neck 30 is then released and allowed to return to its natural round shape. Pulling the bag down gently seats the neck 30 snuggly into the collar 55. In this embodiment, the neck 30 should protrude below the collar 55 approximately ½ inch (FIG. 1). The neck 30 engages the tapered inner circumference of collar 55 to couple the device 50 and bag 20 where the openings 23 and lower opening 54 are contiguous. The collar 55 in one embodiment is to be made 0.020 to 0.030 inches thick or may be any thickness that is structurally sound. The collar may be constructed of a plastic or of a rigid material such as steel or stainless steel.

The taper of the neck and collar should be the same and is preferably about 5 degrees. Preferably, the neck and collar tapers are sized so that the neck does not pull out of the collar, nor does it wedge in so tightly that the device and bag may not be separated. According to one embodiment of the invention, the bag 20 is removable and replaceable from the device.

In one use, as an insect trap, the bag 20 and device 50 are coupled together after the bag has been filled with an attractant or a lure has been placed in the device. The neck 30 and collar 55 of the main body 51 are joined so that the attractant permeates through the contiguous openings 23 and 54 and through the vents 61a in the funnel 61 and through the opening in the main body 60 to draw insects into the trap device 50 through the funnel 61. Once the insects have entered through the funnel 61 they will tend to move up within the device 50 away from the funnel opening 61b. The main body 51 is constructed of a translucent material that allows some light through whereas the funnel 61 is preferably constructed of an opaque material. Thus, the insects drawn towards the light will tend to move up towards the light and not to exit out the funnel opening 61b.

The bag 20 is hung from the trap body which is hung by a string or wire attached to a hole 68 in the cap 66. When the bag 20 is full, it can be removed by first closing off the bag 20, e.g., tying it around the neck region 22 so that any captured insects will not be able to escape when the bag 20 is removed. The bag may be discarded while the trap device 50 is retained for reuse. Another bag may then be inserted into the device with a new lure or attractant.

In use, for example, as a fly trap, in one embodiment, a liquid attractant is mixed and place in the bottom portion 21 of the bag. In use, for example, as a yellow jacket trap, a lure is hung over the neck and located within the bottom portion 21 of the bag 20.

The bag and attachment device may have alternative uses as an insect trap, such as, for example, as a monitoring device for determination of degree of infestation.

Figure 8:
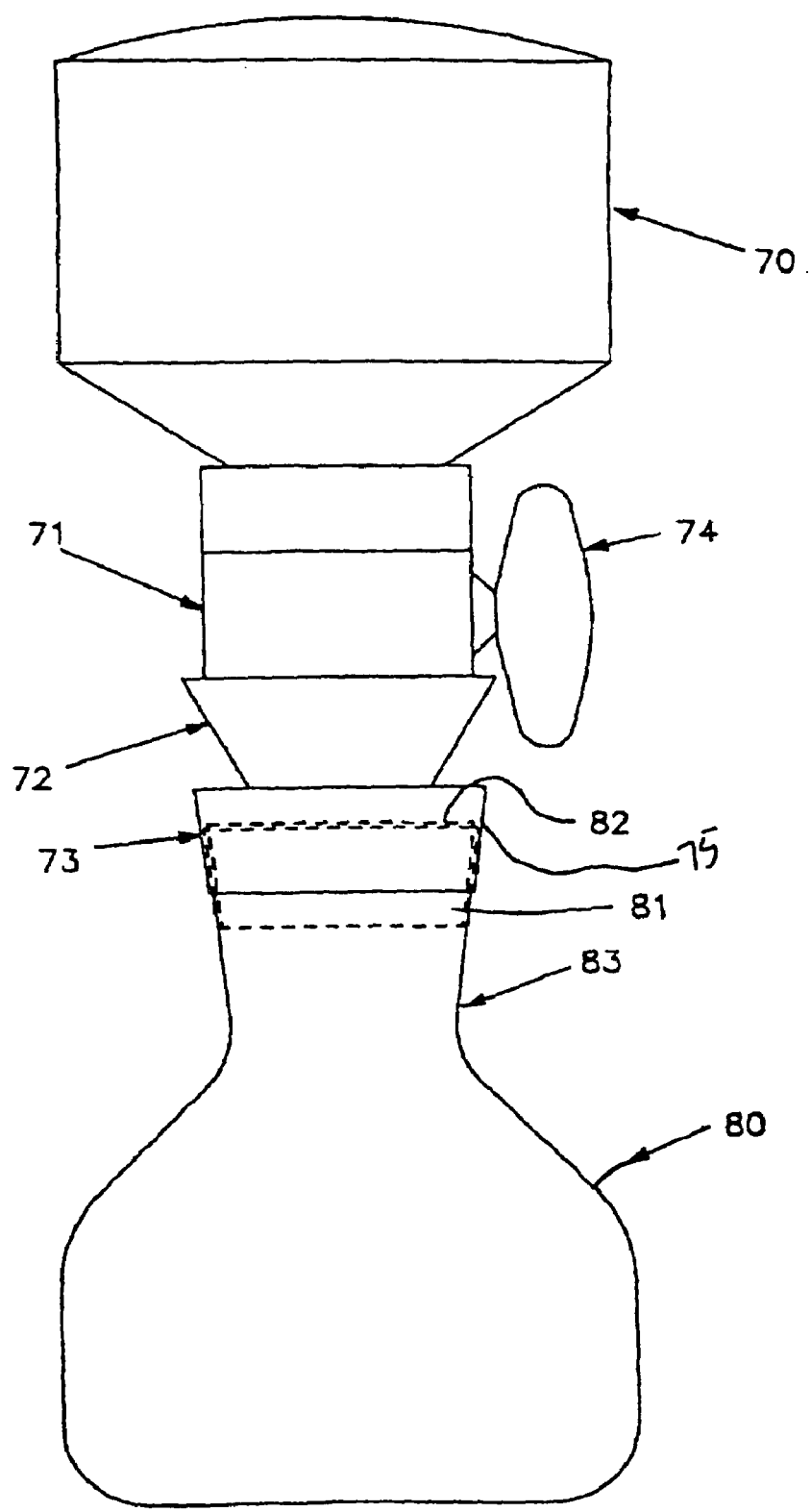
FIG. 8 is a side view of a second embodiment of the invention.

Referring now to FIG. 8, an alternative embodiment of a bag and attachment device is illustrated. In this application a bag 80 is attached to a dispenser 70 which may be a grinding or mixing machine. The dispenser 70 includes a valve 71 for selectably releasing material from the dispenser 70, and an attachment device 75 for coupling the dispenser 70 to the bag 80. The valve 71 is couple to an outlet port (not shown) of the dispenser 70. The valve 71 includes a knob 74 that actuates the opening or closing of the valve 71 to prevent or permit the release of material from the dispenser 70. The attachment device 75 is coupled to the outlet (not shown) of the valve 71 and comprises a funnel 72 and attachment collar 73 with a tapered inner circumference. The valve 71 is coupled to the funnel 72 so that when the valve 71 is opened, the funnel 72 directs material from the valve 71 through the attachment collar 73. The bag 80 includes a neck 81 attached around the circumference of an opening 82 in the narrow neck portion 83 of the bag 80. The neck 81 is tapered to engage to the tapered inner circumference of the attachment collar 73 of the attachment device 75 of the dispenser 70. The bag 80 and neck 81 are attached to the attachment collar 73 in a manner similar to bag 20, neck 30 and attachment collar 55 described above with reference to FIGS. 1–7 and are constructed of similar materials as bag 20, neck 30 and attachment collar 55 described above.

With the valve 71 closed, where the dispenser is a grinding or mixing machine, the machine is used to grind or mix material such as coffee, spices or other foods, or other solid or liquid materials. After the material is ground and/or mixed, the knob 74 is used to open the valve 71, allowing the material to fall into the attached bag 80. Thus, the material may be dispensed into the bag without spillage or human contact with the material. After the material is in the bag, 80, the bag can be closed with a twist tie. The bag 80 and neck 81 can be removed from the collar 73 in a manner similar to that of bag 20, neck 30 and collar 55 described above with reference to FIGS. 1–7.

Alternatively the dispenser 70 may simply contain and/or dispense material. Also, the machine or dispenser may be constructed without a valve allowing material to fall directly into the bag (in one embodiment, after being ground or mixed.) Similarly, as noted above with respect to the bag 20 and neck 30 of FIGS. 1–7, the neck 81 of the bag 80 may be separable from the bag 80, for example a portion of the narrow region 83 of the bag 80 may be folded around the neck 81.

In one variation of the dispensing machine, the bag may be water bag such as, for example a Camelback™ used to transport water. The neck 81 may be attached to the bag 80 by folding a portion of the bag 80 at the opening 82 around the neck 81. The neck is coupled to the attachment device 75, which is attached to dispenser 70 for dispensing water (e.g. a water faucet or spout).

Alternative uses of the bag and attachment device may include numerous variations of, e.g., food storage, mixing and dispensing, dry goods and/or liquids storage, mixing and dispensing. In these devices, another similar attachment device may be attached to the bag such as a cap to close the device.

According to one embodiment according to the invention, a method of sealing a bag is provided. Accordingly, the method includes providing a flexible bag comprising a neck region defining a bag opening into the bag; providing a neck member comprising a tapered neck wall; coupling the neck member to a portion of the bag in the neck region to provide support for the bag opening; providing an attachment device comprising a collar including a collar opening and a tapered collar wall; and positioning the tapered collar wall adjacent the tapered neck wall in a press fit engagement to provide a contiguous opening formed by the collar opening and bag opening. Another aspect of the method may include providing a seal between the portion of the bag coupled to the neck member and the attachment device.

In one embodiment of the method, the collar has an inner circumference comprising said collar tapered wall and the neck member has an outer circumference comprising the tapered neck wall. The neck member may be deformed from an original configuration so that it may be positioned within the collar of the attachment device. After it has been positioned within the collar, neck member is permitted to resiliently return to its original configuration and it is also positioned within the collar so that the tapered neck wall engages the tapered collar wall in a press fit engagement.

One variation of the method includes providing an insect trap device coupled to the attachment device. Another variation of the method includes providing a material dispenser coupled to the attachment device and dispensing material from the attachment device to the bag. In one embodiment, the material dispenser may dispense liquids, e.g. water into a water bag for carrying in a backpack or other pack. The material dispenser may also be a mixing or grinding machine.

What is claimed is:

1. An insect trap comprising an insect trap device and an attachable flexible bag, said attachable flexible bag and said insect trap device each comprising an attachment means wherein said bag and said device are coupled together through said attachment means;
    wherein said trap device comprises a main body, a funnel body, a vane member and a cap assembled together by snap fit;
    wherein said main body has an upper end coupled to said funnel body and an attachment collar having a lower opening formed by a conically tapered side wall for connecting to the neck of the attachable flexible bag,
    wherein said funnel body further comprises a vented funnel providing a top opening into conduit enabling entry of insects into the trap device,
    wherein said vented funnel further allows a lure or attractant odor to permeate through the funnel and out of the top opening to lure the insects through the funnel and into the main body,
    wherein said vane member has sliding vanes, said vane member slidably coupled to funnel body with the cap snapped on to the top of the vane member, the cap and vane member permitting an open position and a closed position;
    wherein said attachable flexible bag has a narrow neck region with a neck opening and a wider closed bottom for holding an insect lure, insect attractant or for collecting insects trapped in the insect trap;
    wherein said neck region has a neck member coupled to the neck region, the neck member and neck region defining a neck opening into the bag;
    wherein said neck member is configured to couple to the tapered wall of the attachment collar of the main body in a press fit coupling to provide a contiguous opening formed by said attachment collar lower opening and said attachable bag neck opening;
    wherein the neck member has a tapered outer wall and is configured to be deformed from an original configuration to be positioned within said attachment collar and is further configured to be resilient to return to its original configuration; and
    wherein said insect trap device or said attachable bag further comprises a lure or attractant.

2. The insect trap of claim 1 wherein said neck member is coupled to said attachment collar removably.

3. The insect trap of claim 2 wherein said attachment collar comprises an inner circumference comprising said tapered wall.

4. The insect trap of claim 1 wherein said dispenser contains the insect attractant or insect lure.

5. The insect trap of claim 2 wherein said attractant or lure is the solid insect lure or attractant configured to be placed within said dispenser.

6. The insect trap of claim 2 wherein said attractant or lure is the liquid insect lure or attractant.

7. The insect trap of claim 1 wherein said insect lure or attractant is the solid lure or attractant configured to be placed within said flexible bag.

8. The insect trap of claim 7 wherein said attractant or lure is the liquid insect lure or attractant.

9. The insect trap of claim 1 wherein the trap is a fly trap.

10. The insect trap of claim 1 wherein the trap is a yellow jacket trap.

* * * * *